(12) United States Patent
Hart et al.

(10) Patent No.: US 10,765,137 B1
(45) Date of Patent: Sep. 8, 2020

(54) FLUID BED COFFEE ROASTING SYSTEM

(71) Applicant: ASHE Industries, LLC, Murrieta, CA (US)

(72) Inventors: David Douglas Hart, Temecula, CA (US); Ernie Arquero Abdon, San Diego, CA (US)

(73) Assignee: ASHE Industries, LLC, Murrieta, CA (US)

( * ) Notice: Subject to any disclaimer, the term of this patent is extended or adjusted under 35 U.S.C. 154(b) by 0 days.

(21) Appl. No.: 16/503,777

(22) Filed: Jul. 5, 2019

(51) Int. Cl.
*A23N 12/08* (2006.01)
*A23F 5/04* (2006.01)

(52) U.S. Cl.
CPC .............. *A23N 12/08* (2013.01); *A23F 5/046* (2013.01)

(58) Field of Classification Search
CPC ...... A23N 12/08; A23N 12/12; A23N 12/125; A23F 5/046
See application file for complete search history.

(56) References Cited

U.S. PATENT DOCUMENTS

| | | | |
|---|---|---|---|
| 3,964,175 A | 6/1976 | Sivetz | |
| 4,687,909 A * | 8/1987 | Eichler | A23N 12/08 219/400 |
| 4,698,916 A * | 10/1987 | Farber | A23N 12/08 34/586 |
| 5,394,623 A * | 3/1995 | Sewell | A23N 12/08 34/494 |
| 5,609,097 A * | 3/1997 | Newnan | A23N 12/083 34/233 |
| 6,173,506 B1 * | 1/2001 | Kruepke | A23N 12/083 34/225 |
| 6,246,831 B1 * | 6/2001 | Seitz | F24H 9/2021 219/483 |
| 2009/0304886 A1 * | 12/2009 | Greenfield | A23F 5/04 426/467 |
| 2014/0314923 A1 | 10/2014 | Sewell et al. | |

* cited by examiner

*Primary Examiner* — Ibrahime A Abraham
*Assistant Examiner* — John J Norton
(74) *Attorney, Agent, or Firm* — Entralta P.C.; Justin G. Sanders; Peter D. Weinstein

(57) ABSTRACT

A fluid bed coffee roasting system is disclosed and configured for roasting batches of coffee beans of varying sizes. In at least one embodiment, the system provides a roasting unit configured for roasting a volume of coffee beans, a chaff collection unit positioned and configured for drawing off and capturing any loose chaff released by the coffee beans within the roasting unit, and a cooling unit positioned and configured for receiving and cooling the coffee beans after they are removed from the roasting unit.

20 Claims, 10 Drawing Sheets

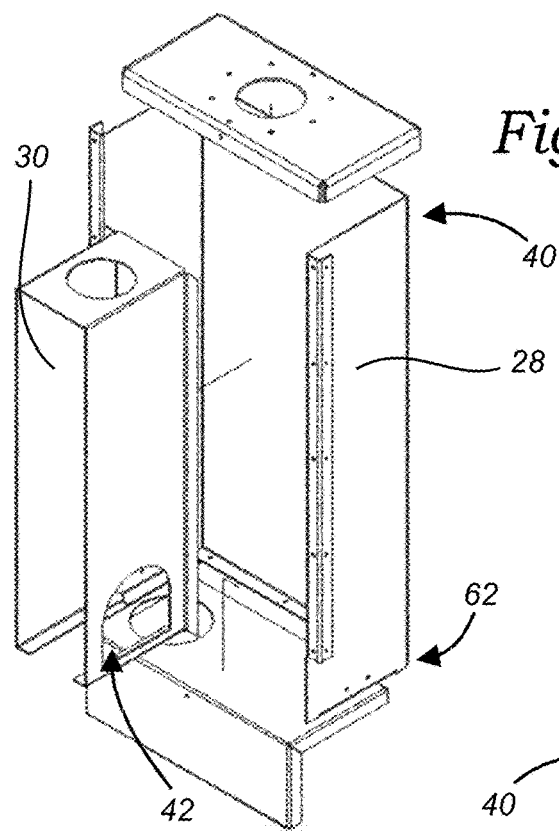
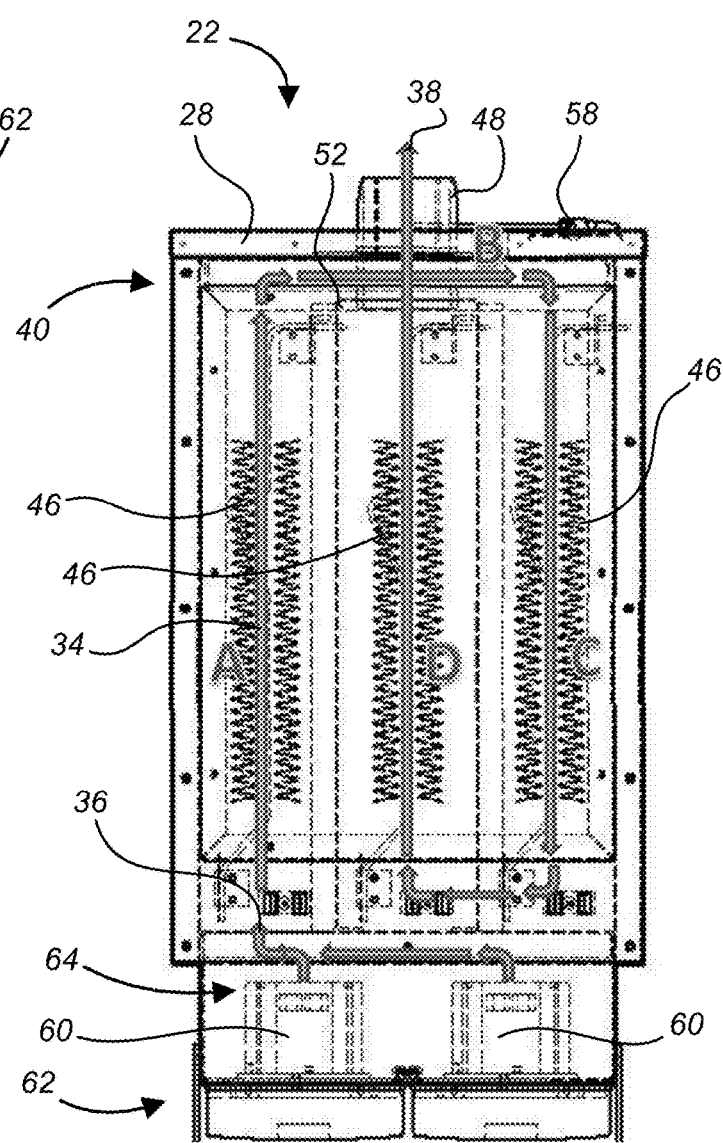
Fig. 7
Fig. 8

| Max Capacity (lbs / kg) (Green Beans) | Heating Elements | Batches / Hr | Capacity / Hr (lbs / kg) (Green Beans) | Min. Batch Size (lbs) | Roast Time (Minutes) | Watts | kW / lb | Heating Circuit Voltage | Freq (Hz) | Phase | Amps |
|---|---|---|---|---|---|---|---|---|---|---|---|
| 11lb / 5kg | 3 | 4 | 44lb / 20kg | 6lb / 2.7kg | 12 | 11,250 | 1.02 | 240 | 50/60 | 1 | 50 |
| 11lb / 5kg | 3 | 4 | 44lb / 20kg | 6lb / 2.7kg | 12 | 11,250 | 1.02 | 208 | 50/60 | 3 | 30 |
| 15.5lb / 7kg | 3 | 4 | 64lb / 28kg | 9lb / 4.1kg | 13 | 15,600 | 1.00 | 240 | 50/60 | 1 | 65 |
| 15.5lb / 7kg | 3 | 4 | 64lb / 28kg | 9lb / 4.1kg | 13 | 15,600 | 1.00 | 208 | 50/60 | 3 | 40 |
| 22lb / 10kg | 3 | 4 | 88lb / 40kg | 13lb / 6kg | 14 | 18,000 | .81 | 240 | 50/60 | 1 | 80 |
| 22lb / 10kg | 3 | 4 | 88lb / 40kg | 13lb / 6kg | 14 | 18,000 | .81 | 208 | 50/60 | 3 | 50 |
| 26.5lb / 12kg | 3 | 4 | 106lb / 48kg | 17lb / 7.7kg | 15 | 20,400 | .77 | 208 | 50/60 | 3 | 60 |

*Fig. 16*

FLUID BED COFFEE ROASTING SYSTEM

RELATED APPLICATIONS

Not applicable.

BACKGROUND

The subject of this patent application relates generally to coffee roasters, and more particularly to a fluid bed coffee roasting system configured for roasting batches of coffee beans of varying sizes—ranging from relatively small profile sizes to relatively large production sizes—without increasing the size of the system, operating costs of the system, or desired roasting times.

Applicant(s) hereby incorporate herein by reference any and all patents and published patent applications cited or referred to in this application.

By way of background, the process of roasting coffee beans commonly involves the use of either a drum roasting system or a fluid bed roasting system. Fluid bed roasting systems use a stream of high velocity air that is heated using electric resistive heating elements, or gas burners fueled by propane or natural gas. This high velocity hot air is used to levitate and roast green coffee beans in a fluidized bath of hot air, allowing uniform roasting of the individual beans. Heat is transferred directly to the mass of green coffee beans via convection through the heated air. This is distinguished from roasting coffee using a drum roasting system which relies primarily on conductive heat transfer through the heated drum wall which the green coffee is tumbled against during the roasting process which, in turn, typically results in a relatively less uniform roast of the individual beans. Additionally, as the coffee beans are levitated in the hot air stream, they roll and tumble in the super-heated air, which causes unwanted by-products of the roast (i.e., burnt chaff, under size or broken beans, etc.) to be expelled by the convective/lifting action of the hot air. However, while fluid bed roasting systems are often capable of producing relatively higher quality coffee beans, they are traditionally limited in the volume of beans that can be roasted in a given batch. Specifically, most traditional fluid bed coffee roasters are capable of roasting no more than 10 to 12 pounds of beans in a given batch. In other words, with traditional fluid bed roasting systems, the only ways to increase the volume of beans in a given batch have been to increase the size, air temperature, and/or air velocity of the fluid bed roasting system (which could potentially render the system too large to fit in a user's facility, or too expensive to operate), or to increase the roasting times (which could potentially over-roast a portion of the beans). Thus, there remains a need for a fluid bed coffee roasting system capable of roasting relatively larger batches of beans without increasing the size of the system, operating costs of the system, or roasting times.

Another recognized issue in the relevant art is in connection with producing sample roasts. Traditionally, commercial coffee roasting systems are designed to process relatively large volumes of coffee, which is ideal for the coffee distributors and wholesale coffee roasters. However, developing a roasting receipt profile (i.e., a time versus temperature relationship) for a given grade or variety of green coffee bean can be expensive and time consuming due to the larger batch sizes that must be experimented with to obtain the desired roast profile. To control costs, many roasters are forced to buy a separate "sample" roaster, which is scaled in size for smaller sample batch quantities, but is a completely different coffee roaster from that being used to roast the larger commercial batch sizes. The disadvantage in using a separate sample roaster is that a sample roaster is not the same roaster that larger production batches will be roasted in. As a result, the correlation between the results of a sample roaster and a production roaster are always in question, because two different roasting machines are used. Thus, there remains a need for a fluid bed coffee roasting system capable of roasting both production batch sizes as well as sample batch sizes.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a fluid bed coffee roasting system configured for roasting batches of coffee beans of varying sizes. In at least one embodiment, the system provides a roasting unit configured for roasting a volume of coffee beans, a chaff collection unit positioned and configured for drawing off and capturing any loose chaff released by the coffee beans within the roasting unit, and a cooling unit positioned and configured for receiving and cooling the coffee beans after they are removed from the roasting unit. In at least one such embodiment, the roasting unit provides a roast housing that supports an at least one open-ended roasting chamber configured for retaining a volume of coffee beans therewithin during use of the roasting unit. The roasting unit also provides an at least one roasting blower in fluid communication the roasting chamber and configured for moving a volume of air into the roasting chamber at a velocity sufficient for levitating the coffee beans in a bed of air within the roasting chamber. The cooling unit provides a cooler housing that supports an at least one cooling blower, along with a cooling tray positioned and configured for receiving the coffee beans from the roasting chamber and allowing the cooling blower to draw ambient air down through the cooling tray, thereby cooling the coffee beans. The chaff collection unit provides a collection housing that supports an at least one collection blower in selective fluid communication with each of a suction hood, via a collection tube, and the cooler housing, via a cooling tube. The suction hood is configured for pivoting relative to the roasting unit and selectively moving between one of an active position—wherein the suction hood is pivoted toward the roasting unit so as to be positioned directly overtop of the roasting chamber—and an inactive position—wherein the suction hood is pivoted away from the roasting unit so as to no longer be positioned directly overtop of the roasting chamber. The at least one collection blower is configured for being selectively switched between a collection mode—wherein the at least one collection blower provides suction to the suction hood in order to draw loose chaff from roasting chamber when the suction hood is in the active position—and a cooling mode—wherein the at least one collection blower provides suction to the cooler housing in order to draw additional ambient air down through the cooling tray when the suction hood is in the inactive position.

In at least one further embodiment, the roasting unit provides a roast housing which provides an at least one partition positioned within the roast housing which defines a plurality of heating chambers in serial fluid communication with one another, thereby forming an air path having an initial end and a terminal end. An upper end of the roast housing provides an upwardly-directed air nozzle in fluid communication with the terminal end of the air path. An open-ended roasting chamber is configured for retaining a volume of coffee beans therewithin during use of the roasting unit, with a base plate of the roasting chamber providing an inlet orifice that is removably engagable with the air nozzle. An at least one roasting blower is in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber. The roast housing further provides a heating panel containing a plurality of heating elements positioned thereon, with the heating elements arranged on the heating panel so as to be positioned within one or more of the heating chambers. As air moves through the air path during use of the roasting unit, the air is forced to pass over each of the heating elements in series, thereby progressively increasing the temperature of the air until the air reaches the terminal end of the air path.

In at least one still further embodiment, the roasting unit provides a roast housing which provides an at least one heating chamber that forms an air path having an initial end and a terminal end. An upper end of the roast housing provides an upwardly-directed air nozzle in fluid communication with the terminal end of the air path. A tilt arm is pivotally engaged with the roast housing and provides an aperture extending therethrough from a top surface to an opposing bottom surface of the tilt arm. The tilt arm further provides a mating portion positioned within the aperture and extending from the bottom surface of the tilt arm for selectively creating an airtight engagement with the air nozzle. An at least one open-ended roasting chamber is configured for retaining a volume of coffee beans therewithin during use of the roasting unit. Each of the at least one roasting chamber provides a base plate of substantially uniform dimensions configured for engagement with a top surface of the tilt arm, with the base plate providing an inlet orifice in fluid communication with the aperture of the tilt arm. An at least one roasting blower is in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber. The roast housing further provides a heating panel containing an at least one heating element positioned thereon, with the at least one heating element arranged on the heating panel so as to be positioned within the at least one heating chamber for heating the air as the air moves through the air path during use of the roasting unit. The tilt arm is capable of selectively moving between one of an active position—wherein the tilt arm is pivoted toward the roasting unit so as to be a fluid communication between the air nozzle and the inlet orifice of the roasting chamber via the aperture—and an inactive position—wherein the tilt arm is pivoted away from the roasting unit, thereby disrupting the fluid communication between the air nozzle and the inlet orifice of the roasting chamber, and subsequently tipping the roasting chamber so that the roasted coffee beans are dumped out of the roasting chamber.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 7 is an exploded view of the exemplary roast housing of FIG. 6, in accordance with at least one embodiment;

FIG. 8 is a diagrammatic view of the exemplary roaster, in accordance with at least one embodiment;

FIG. 16 is a table providing exemplary data in connection with roasting green coffee beans using the exemplary fluid bed coffee roasting system, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
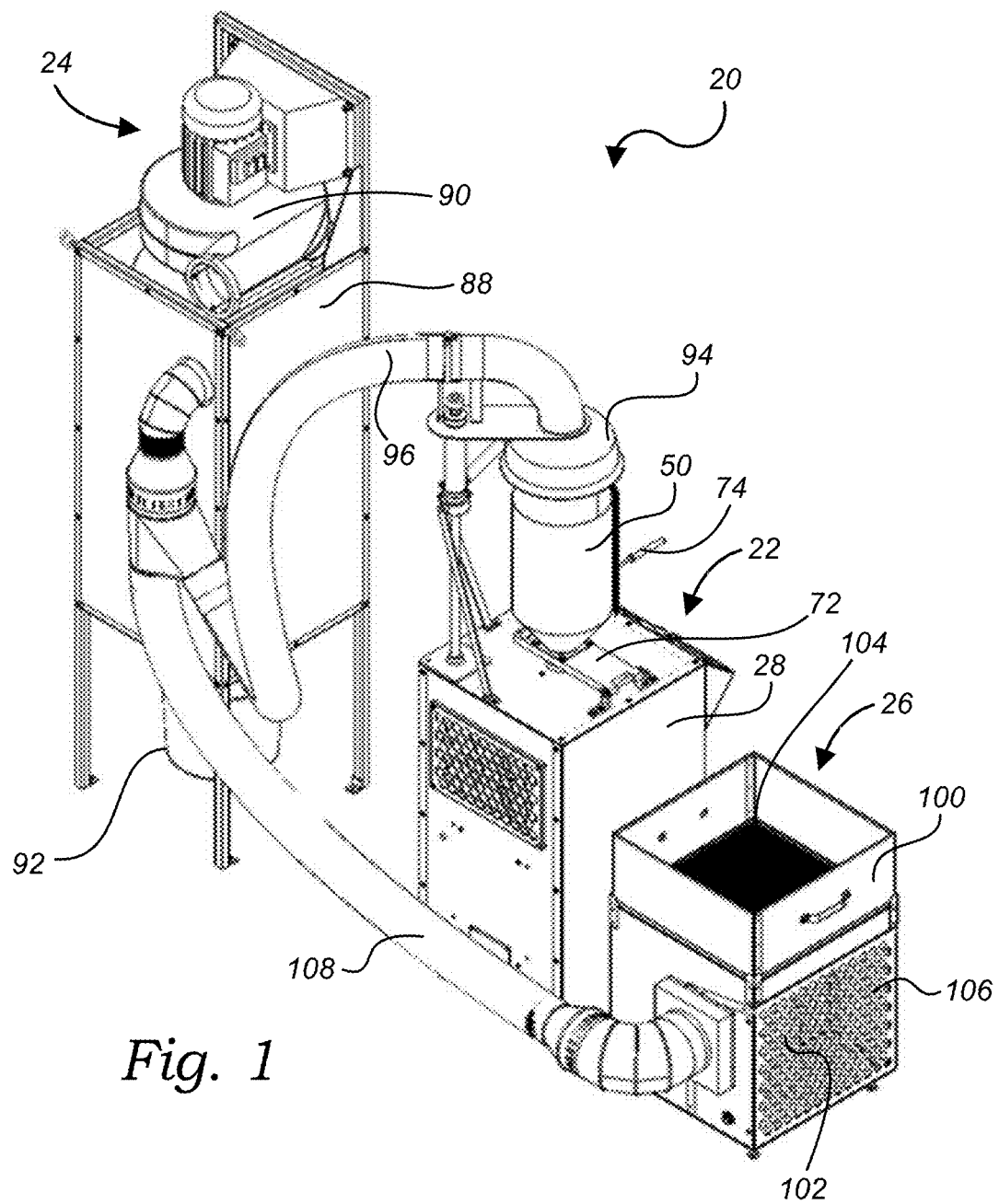
FIG. 1 is a perspective view of an exemplary fluid bed coffee roasting system, in accordance with at least one embodiment.
Figure 2:
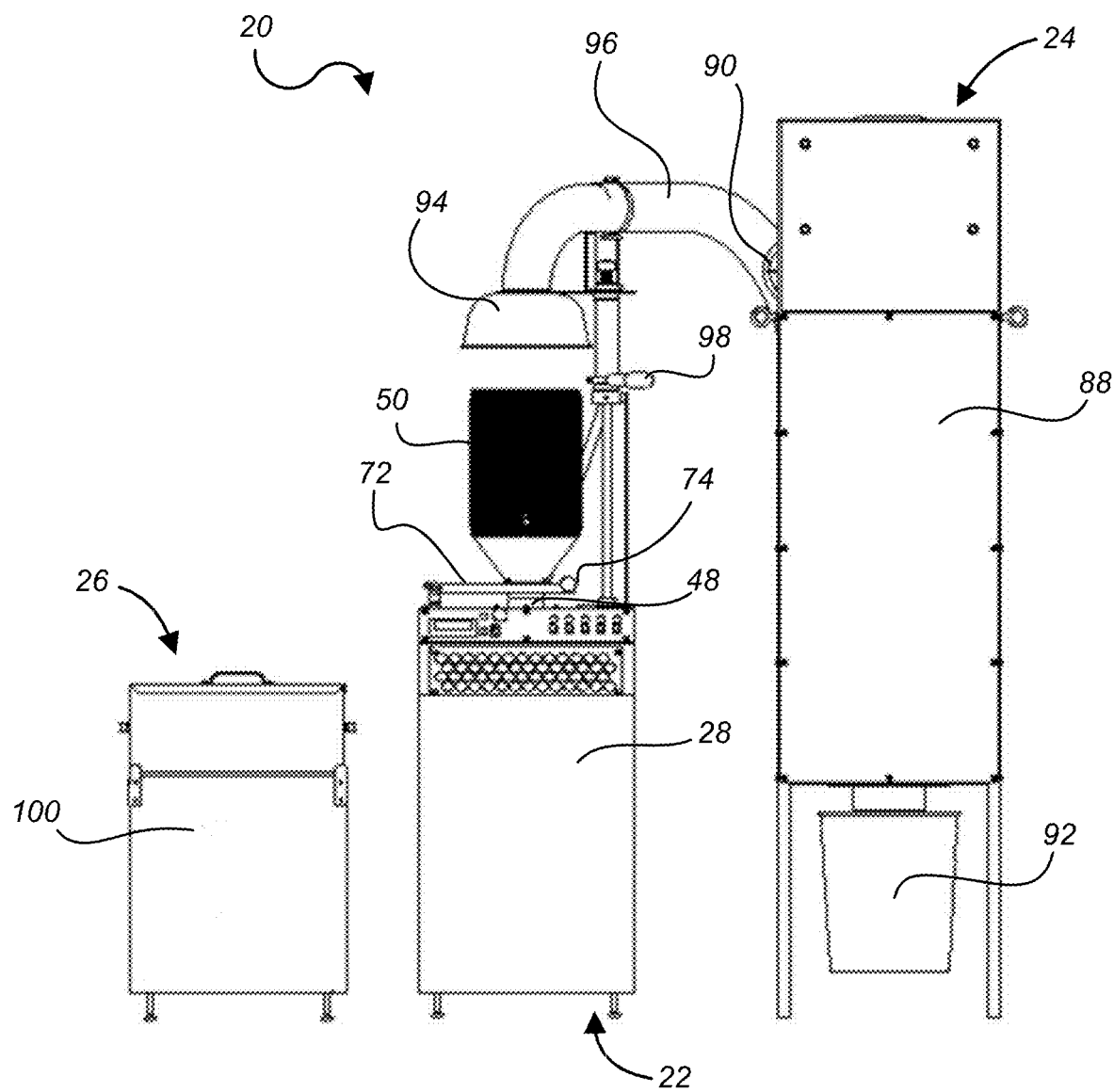
FIG. 2 is an elevational view of a further exemplary fluid bed coffee roasting system, in accordance with at least one embodiment.

Turning now to FIGS. 1 and 2, there is shown an exemplary fluid bed coffee roasting system 20. In at least one embodiment, as discussed in detail below, the system 20 provides a roasting unit 22 configured for roasting a volume of coffee beans, a chaff collection unit 24 positioned and configured for drawing off and capturing any loose chaff released by the coffee beans within the roasting unit 22, and a cooling unit 26 positioned and configured for receiving and cooling the coffee beans after they are removed from the roasting unit 22. At the outset, it should be noted that while the roasting unit 22, chaff collection unit 24 and cooling unit 26 are depicted in the drawings as being three separate components, in at least one further embodiment, one or more of the roasting unit 22, chaff collection unit 24 and cooling unit 26 may be combined or otherwise integrated into a single component. Furthermore, the respective size, shape and dimensions of each of the roasting unit 22, chaff collection unit 24 and cooling unit 26 as depicted in the drawings (and as described herein) is merely exemplary; thus, in further embodiments, each of the roasting unit 22, chaff collection unit 24 and cooling unit 26 may take on any other size, shape and/or dimensions, now known or later developed, so long as the system 20 is capable of substantially carrying out the functionality described herein.

In at least one embodiment, as illustrated in FIGS. 3-8, the roasting unit 22 provides a roast housing 28. In at least one such embodiment, the roast housing 28 has a height of approximately thirty-two inches (32"), a width of approximately eighteen inches (18"), and a depth of approximately eighteen inches (18"); however, again, in further embodiments, the roast housing 28 may take on any other dimensions, now known or later developed. In at least one embodiment, as illustrated best in FIGS. 5 and 7, the roast housing 28 provides an at least one partition 30 positioned within the roast housing 28 which defines a plurality of heating chambers 32 in serial fluid communication with one another, thereby forming an air path 34 (FIG. 8) having an initial end 36 and a terminal end 38. In at least one such embodiment, the heating chambers 32 are positioned adjacent to one another, thereby forming a winding air path 34 within the roast housing 28—which increases a total length of the air path 34 without increasing the dimensions of the roast housing 28, the importance of which is discussed further below. In at least one such embodiment, as best illustrated in FIG. 8, the at least one partition 30 defines a substantially vertically-oriented first heating chamber A and a laterally spaced-apart, substantially vertically-oriented third heating chamber C, with a substantially horizontally-oriented second heating chamber B positioned proximal an upper end 40 of the roast housing 28 and interconnecting the first and third heating chambers A and C. Additionally, a substantially vertically-oriented fourth heating chamber D is positioned between the first and third heating chambers A and C, with the at least one partition 32 defining a hole 42 which interconnects the third heating chamber C with the fourth heating chamber D. Thus, where the roast housing 28 has a height of approximately thirty-two inches (32"), a width of approximately eighteen inches (18"), and a depth of approximately eighteen inches (18"), such an arrangement of heating chambers 32 results in the air path 34 having a length of approximately 128 inches (128"). In other words, such a compact arrangement of heating chambers 32 results in an air path 34 having a length that is roughly four times greater than the height of the roast housing 28. Furthermore, such an embodiment allows for a central discharge (as discussed below) like a traditional "straight through" fluid bed roaster, but with an air path 34 roughly four times longer than a traditional "straight through" fluid bed roaster, for increased residence time within the heating chambers 32. In further such embodiments, the number and arrangement of heating chambers 32—and, thus, the length and configuration of the resulting air path 34—may vary, so long as the system 20 is capable of substantially carrying out the functionality described herein.

Figure 4A:
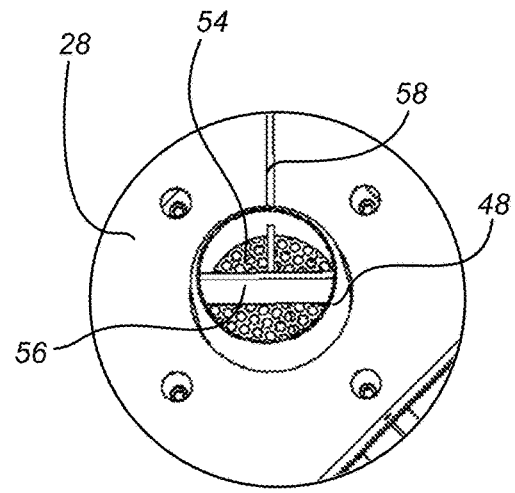
FIG. 4A is a detailed view of the section defined by line 4A of FIG. 4.
Figure 4:
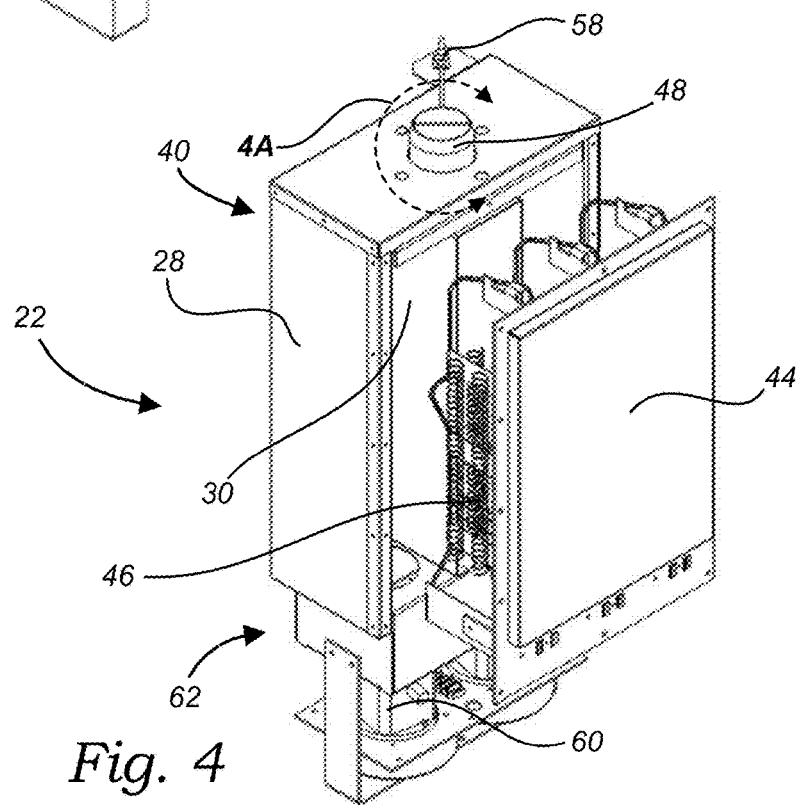
FIG. 4 is a further perspective view of the exemplary roaster, with an exemplary heating panel exploded therefrom, in accordance with at least one embodiment.
Figure 5:
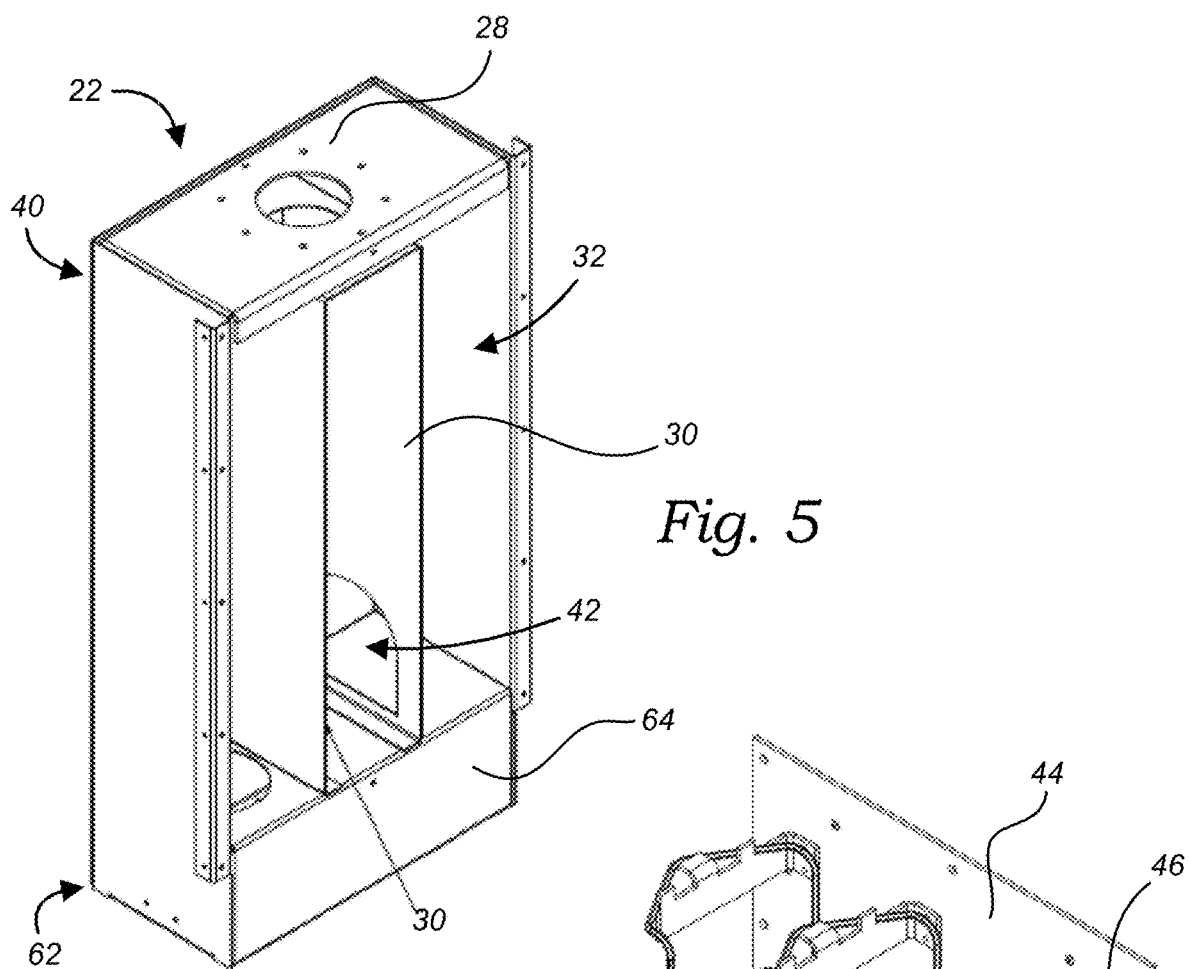
FIG. 5 is a perspective view of an exemplary roast housing of the exemplary roaster, in accordance with at least one embodiment.
Figure 6:
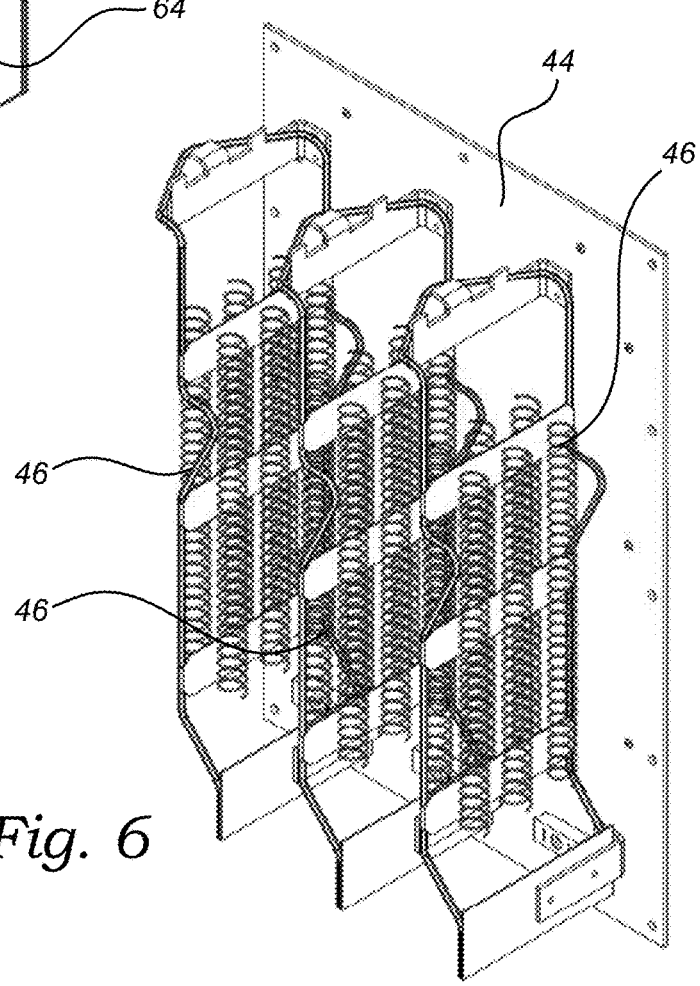
FIG. 6 is a perspective view of the exemplary heating panel, in accordance with at least one embodiment.

In at least one embodiment, as illustrated best in FIGS. 4, 6 and 8, the roast housing 28 provides a heating panel 44 containing a plurality of electric heating elements 46 positioned thereon. In at least one embodiment, each of the heating elements 46 is configured for being selectively heated during use of the system 20. In at least one embodiment, the heating panel 44 is removably engaged with the roast housing 28, thereby increasing the ease with which the heating elements 46 may be accessed for repair or replacement. However, in at least one further embodiment, the heating panel 44 is permanently engaged with the roast housing 28. In at least one embodiment, the heating elements 46 are arranged on the heating panel 44 so as to be positioned within one or more of the heating chambers 32. Additionally, in at least one embodiment, each of the heating elements 46 is oriented within the corresponding heating chamber 32 so as to be substantially parallel with the air path 34 within said heating chamber 32. Thus, as air moves through the air path 34 during use of the system 20, the air is forced to pass over each of the heating elements 32 in series, thereby progressively increasing the temperature of the air until the air reaches the terminal end 38 of the air path 34. In the exemplary embodiment illustrated in FIGS. 4, 6 and 8, a first heating element 46 is positioned within the first heating chamber A, a second heating element 46 is positioned within the third heating chamber C, and a third heating element 46 is positioned within the fourth heating chamber D. It should be noted that in such an embodiment, a further heating element 46 is not necessarily positioned within the second heating chamber B, given that the second heating chamber B is able to be sufficiently heated through conduction from the heating elements 46 positioned with each of the first, third and fourth heating chambers A, C and D. However, in further such embodiments, just as the number and arrangement of heating chambers 32 may vary, so too may the number and arrangement of heating elements 46—so long as the system 20 is capable of substantially carrying out the functionality described herein. As mentioned above, in at least one embodiment, each of the heating elements 46 is configured for being selectively heated during use of the system 20. As a result, the temperature of the air moving through the air path 34 can be adjusted by selectively heating more or fewer of the heating elements 46.

In at least one embodiment, the electric heating elements 46 are resistance wire coils. However, in further embodiments, the heating elements 46 may comprise any other component (or combination of components)—now known or later developed—capable of being heated using electricity (such as electric heating rods, for example). In still further embodiments, various types of non-electric heating elements—now known or later developed—may be substituted (such as gas heating elements, for example). In at least one embodiment, the roasting unit 22 is configured for being powered by both 1-phase, 240V power and 3-phase, 208V power, given that many commercial building sites only have 3-phase, 208V power available as standard electrical service. In such embodiments, the roasting unit 22 provides no more than three electric heating elements 46, in order to ensure that a balanced 3-phase electrical load can be maintained during use of the system 20.

Figure 3:
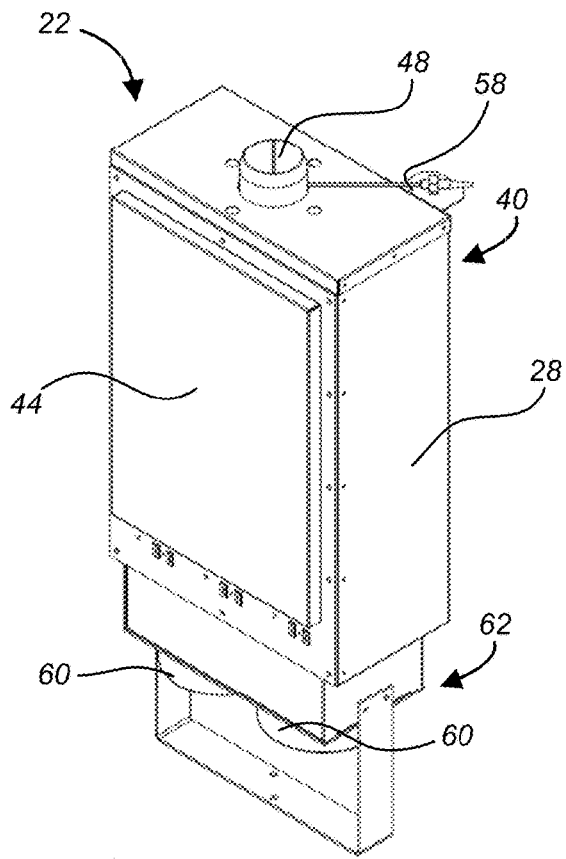
FIG. 3 is a perspective view of an exemplary roaster of the exemplary fluid bed coffee roasting system, in accordance with at least one embodiment.

In at least one embodiment, as illustrated best in FIGS. 3 and 4, the upper end 40 of the roast housing 28 provides an upwardly-directed air nozzle 48 in fluid communication with the terminal end 38 of the air path 34, with the air nozzle 48 being positioned and configured for removable engagement with an open-ended roasting chamber 50 (where the green coffee beans are contained while roasting), the details of which are discussed further below. In at least one embodiment, as illustrated in FIG. 8, the air nozzle 48 extends through the substantially horizontally-oriented second heating chamber B and connects to an upper end 52 of the fourth heating chamber D, which allows for a central discharge positioning of the air nozzle 48 like a traditional "straight through" fluid bed roaster. Additionally, in at least one embodiment, as illustrated in FIG. 4A, a perforated screen 54 spans the air nozzle 48 for assisting with forming the high-velocity, heated air into a substantially vertically-oriented column as the air exits the air nozzle 48 and enters the roasting chamber 50. In at least one such embodiment, the perforated screen 54 is comprised of a hole pattern of sufficient size to prevent debris or foreign matter from entering the heating chambers 32 when the roasting unit 22 is not in use. Additionally, in at least one such embodiment, the perforated screen 54 is orientated with the surface containing the die roll of the perforated holes facing downward—i.e., toward the heating chambers 32 below. Additionally, in at least one such embodiment, the perforated screen 54 is permanently engaged with the air nozzle 48. In at least one embodiment, the air nozzle 48 further provides a substantially vertically-oriented air director 56 positioned within the air nozzle 48, above the perforated screen 54. The air director 56 further assists with forming the high-velocity, heated air into a substantially vertically-oriented column as the air exits the air nozzle 48 and enters the roasting chamber 50, for better ensuring that the column of air is directed to a center of mass of the coffee beans in the roasting chamber 50 which, in turn, results in a more even roasting of the coffee beans. In at least one embodiment, the roasting unit 22 further provides an at least one thermometer 58 positioned and configured for measuring the temperature of the air as it exits the terminal end 38 of the air path 34, thereby allowing the temperature of the air to be adjusted as needed. In at least one such embodiment, the at least one thermometer 58 is a thermocouple probe engaged with the air nozzle 48 in a position substantially perpendicular to the air director 56. In still further embodiments, the at least one thermometer 58 may comprise any other mechanism (or combination of mechanisms)—now known or later developed—capable of measuring the temperature of the air. Furthermore, in still further embodiments, the at least one thermometer 58 may be positioned elsewhere on or within the roasting unit 22.

In at least one embodiment, as illustrated best in FIGS. 3, 4, and 8, the roast housing 28 further provides an at least one fan or blower (hereinafter referred to simply as a roasting blower 60) in fluid communication with the initial end 36 of the air path 34, with the at least one roasting blower 60 positioned and configured for moving a volume of air from the initial end 36 of the air path 34, through the terminal end 38 of the air path 34, and out the air nozzle 48. Typically, larger batch sizes of green coffee beans require relatively more air volume in order to levitate and fluidize the larger mass of beans within the roasting chamber 50. For example, increasing the batch size from 10 lbs to 22 lbs can require an increase in air volume from 123 CFM to 246 CFM in order to consistently levitate the coffee beans and maintain a fluidized bed within the roasting chamber 50. Accordingly, in at least one embodiment, the speed of the at least one roasting blower 60 is selectively adjustable, thereby allowing the roasting unit 22 to accommodate a variety of batch sizes. With that said, however, a larger volume of air requires relatively more time for that air to absorb a sufficient amount of heat within the heating chambers 32, so that the roasting unit 22 may maintain a roasting time of approximately 15 minutes or less. This is why the heating chambers 32 (along with the corresponding heating elements 46) are arranged in series as discussed above—so as to increase the residence time available for heating the larger volume of air without needing to increase the dimensions of the roast housing 28. It should be noted that the at least one roasting blower 60 may comprise any type of fan or other blowing device, now known or later developed, capable of moving a sufficient amount of air through the air path 34. In at least one embodiment, the at least one roasting blower 60 is positioned proximal a lower end 62 of the roast housing 28. In at least one such embodiment, the lower end 62 of the roast housing 28 provides a pressure chamber 64 in fluid communication with the initial end 36 of the air path 34, and the at least one roasting blower 60 is positioned substantially within the pressure chamber 64. In such an embodiment, the pressure chamber 64 acts to thermally insulate the at least one roasting blower 60 from the heating elements 46 and provides a means to channel the high velocity air into the heating chambers 32. In further embodiments, the at least one roasting blower 60 may be positioned elsewhere, so long as the at least one roasting blower 60 is in fluid communication with the initial end 36 of the air path 34.

Figure 9:
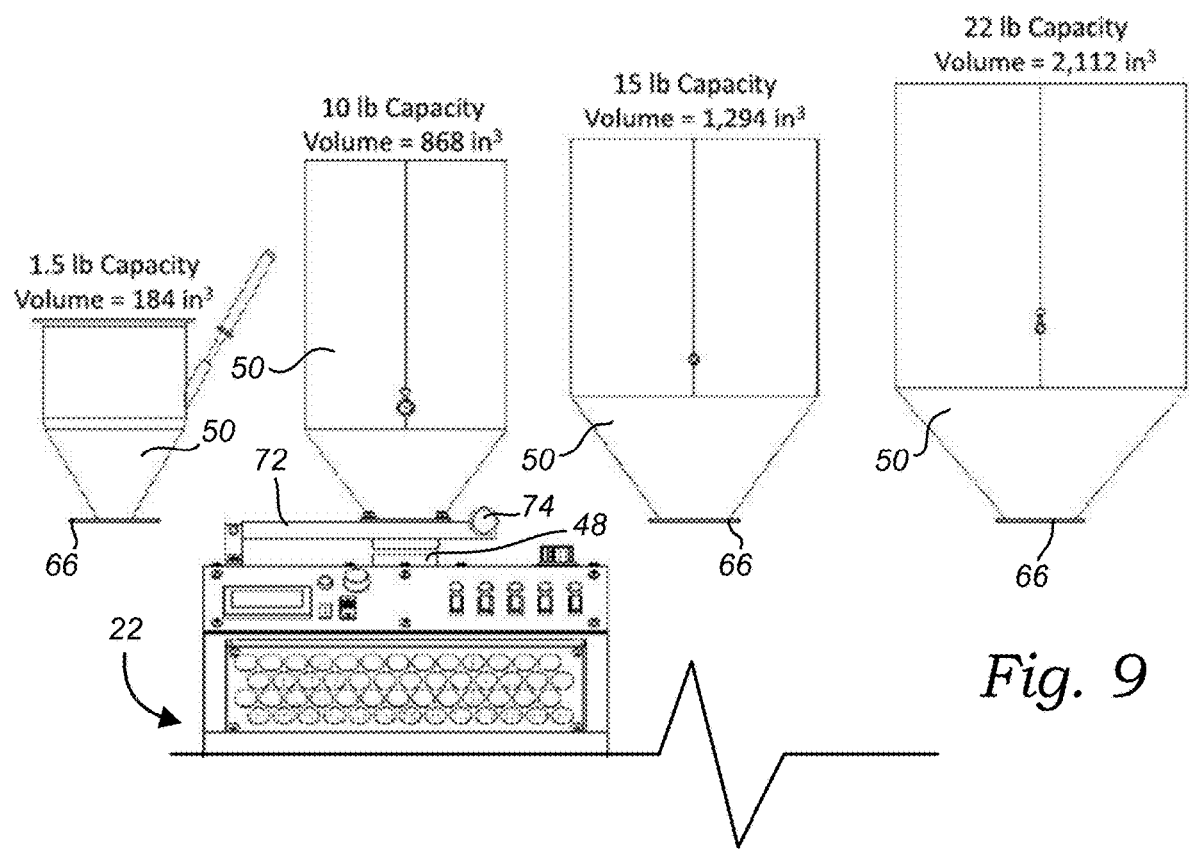
FIG. 9 is a partial diagrammatic view of the exemplary roaster, along with exemplary roast chambers of various sizes, in accordance with at least one embodiment.
Figure 10:
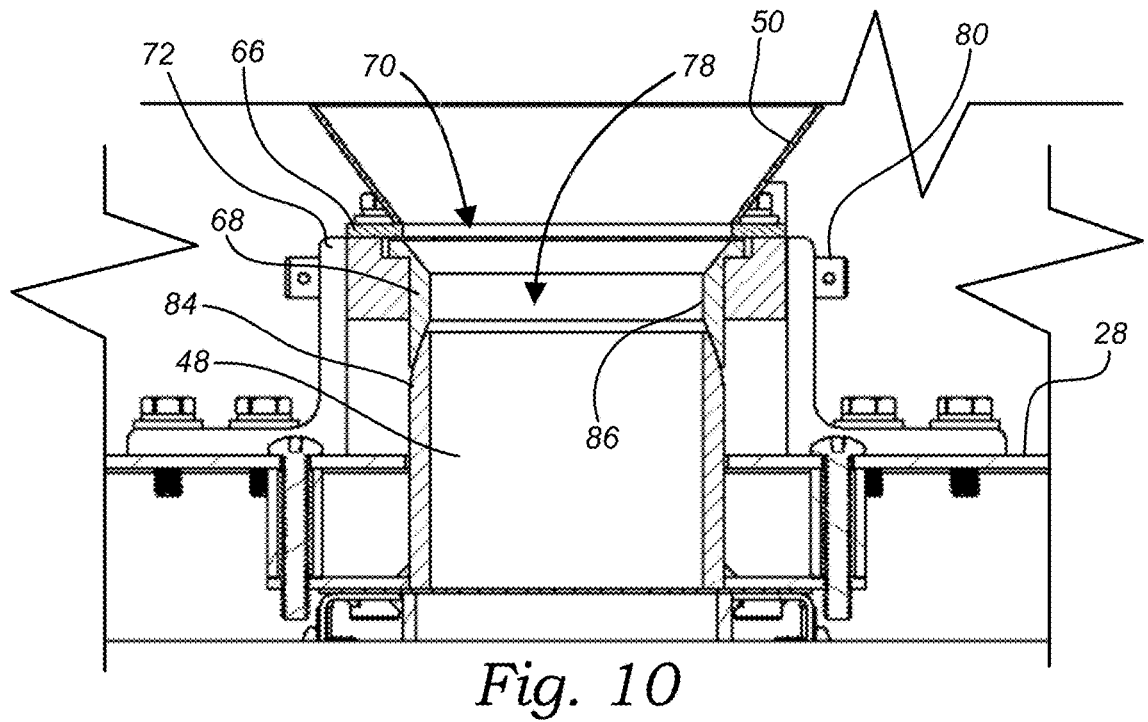
FIG. 10 is a partial cross-sectional view of the exemplary roaster, in accordance with at least one embodiment.

As mentioned above, there exists a need in the art for a fluid bed coffee roasting system capable of roasting both production batch sizes as well as sample (or "profile") batch sizes of varying quantities. To solve this problem, in at least one embodiment, the system 20 provides a plurality of roasting chambers 50 of varying dimensions, with a base plate 66 of each roasting chamber 50 being substantially uniform in dimensions—regardless of the dimensions of the associated roasting chamber 50—so as to be removably engagable with a universal mating portion 68 that is itself sized and configured for removable engagement with the air nozzle 48, as illustrated in FIG. 9. In at least one such embodiment, the base plate 66 of each roasting chamber 50 provides an inlet orifice 70 having a diameter that approximates a diameter of the air nozzle 48—however, the exact diameter of the inlet orifice 70 may vary depending on the dimensions of the roasting chamber 50 itself (i.e., a relatively smaller roasting chamber 50 may have a relatively smaller diameter inlet orifice 70 as compared to a relatively larger roasting chamber 50). In other words, in such embodiments, the mating portion 68 provides a universal engagement interface between the air nozzle 48 and the inlet orifice 70 of a given roasting chamber 50—regardless of the dimensions of the roasting chamber 50. Furthermore, in such embodiments, this flexibility to quickly change between a profile-sized roasting chamber 50 and a production-sized roasting chamber 50 allows the roasting unit 22 to be what Applicant refers to as a "profile-to-production" roasting unit 22. Profile-sized roasting chambers 50 are a fraction of the volume of production-sized roasting chambers 50, yet they are each capable of interfacing with the same roasting unit 22 in such embodiments. This allows for economically developing roast profiles with small batches of green coffee beans on the same production roasting unit 22, without introducing the variable of a different coffee roasting system for small batch sizes.

Figure 11:
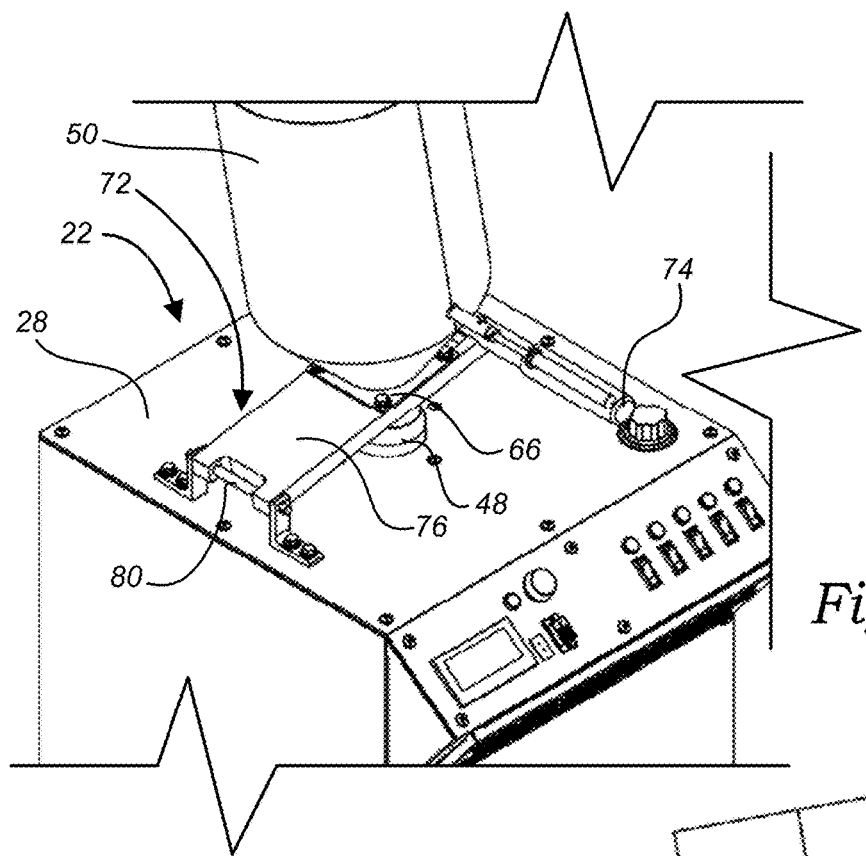
FIG. 11 is a partial perspective view of the exemplary roaster, in accordance with at least one embodiment.
Figure 12:
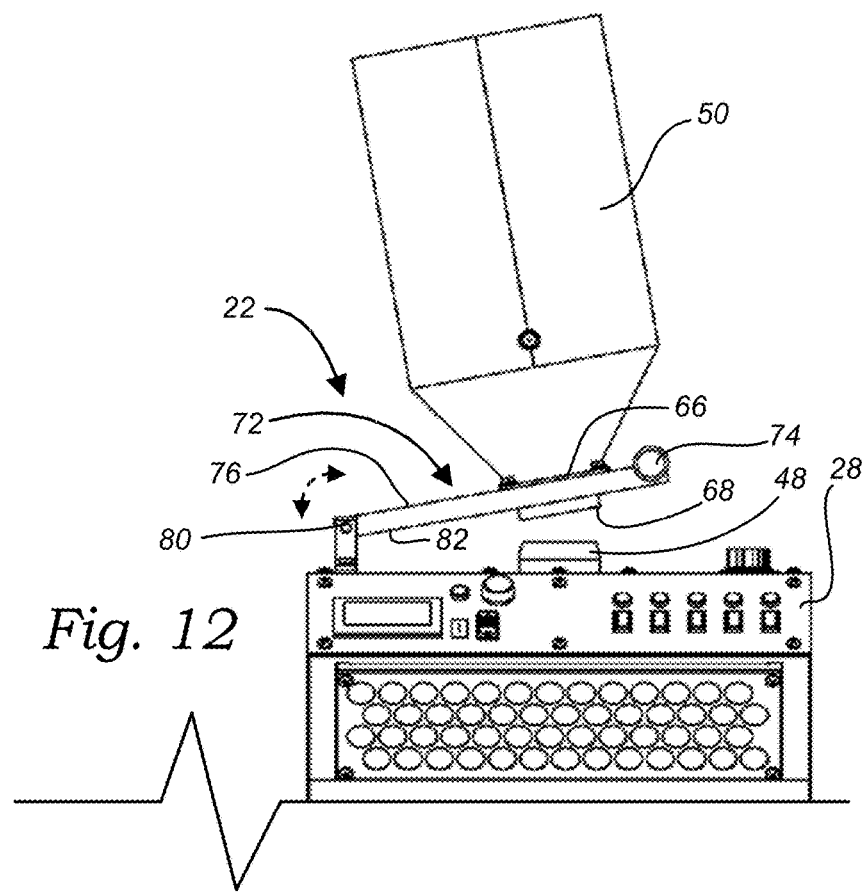
FIG. 12 is a partial elevational view of the exemplary roaster, in accordance with at least one embodiment.

In at least one such embodiment, as illustrated in FIGS. 9-12, removable engagement between the air nozzle 48 and the inlet orifice 70 of a given roasting chamber 50 is achieved via a tilt arm 72 that is pivotally engaged with the roast housing 28 of the roasting unit 22. The tilt arm 72 is capable of selectively moving between one of an active position—wherein the tilt arm 72 is pivoted toward the roasting unit 22 so as to create a removable engagement between the air nozzle 48 and the inlet orifice 70 of the roasting chamber 50—and an inactive position—wherein the tilt arm 72 is pivoted away from the roasting unit 22, toward the cooling unit 26 (FIGS. 1 and 2), thereby disengaging the inlet orifice 70 of the roasting chamber 50 from the air nozzle 48, and subsequently tipping the roasting chamber 50 so that the roasted coffee beans are dumped into the cooling unit 26. In at least one such embodiment, the tilt arm 72 provides an arm handle 74 for manually moving the tilt arm 72 between the active and inactive positions. In at least one such embodiment, as illustrated best in FIG. 10, the base plate 66 of the roasting chamber 50 is removably secured to a top surface 76 of the tilt arm 72, with the tilt arm 72 providing an aperture 78 extending therethrough for interconnecting the inlet orifice 70 of the roasting chamber 50 with the air nozzle 48 when the tilt arm 72 is in the active position. In at least one alternate embodiment, each roasting chamber 50 is permanently secured to the top surface 76 of a different tilt arm 72, with each tilt arm 72 being removably engagable with the roast housing 28 via a removable pivot pin 80 (FIG. 11). In such an alternate embodiment, prior to using the system 20, the desired roasting chamber 50 is engaged with the roast housing 28 by removably engaging the associated tilt arm 72 with the roast housing 28 via the removable pivot pin 80. In at least one embodiment, the mating portion 68 is positioned within the aperture 78 and extends from an opposing bottom surface 82 of the tilt arm 72, creating an airtight engagement with the air nozzle 48 when the tilt arm 72 is in the active position. In at least one such embodiment, an outer surface 84 of the air nozzle 48 is tapered for being removably inserted into the mating portion 68 when the tilt arm 72 is in the active position, with an inner surface 86 of the mating portion 68 having a corresponding chamfered diameter. Thus, during use of the roasting unit 22, with the tilt arm 72 in the active position, the high-velocity, heated air is able to move from the air nozzle 48, through the mating portion 68, and into the roasting chamber 50 in order to roast the green coffee beans. Once the coffee beans have been roasted, the tilt arm 72 can be moved to the inactive position, thereby dumping the coffee beans into the cooling unit 26.

Figure 13:
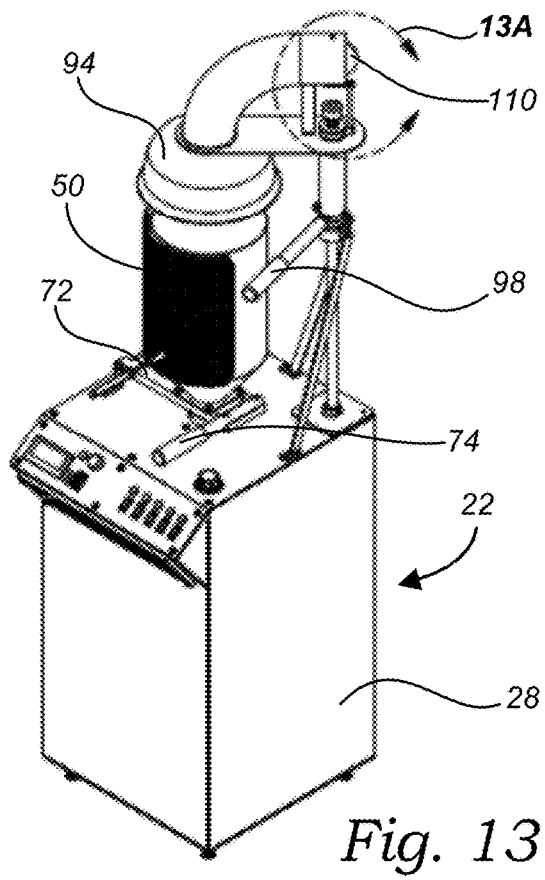
FIG. 13 is a perspective view of the exemplary roaster, with an exemplary chaff hood and accompanying gate valve in an open position, in accordance with at least one embodiment.
Figure 13A:
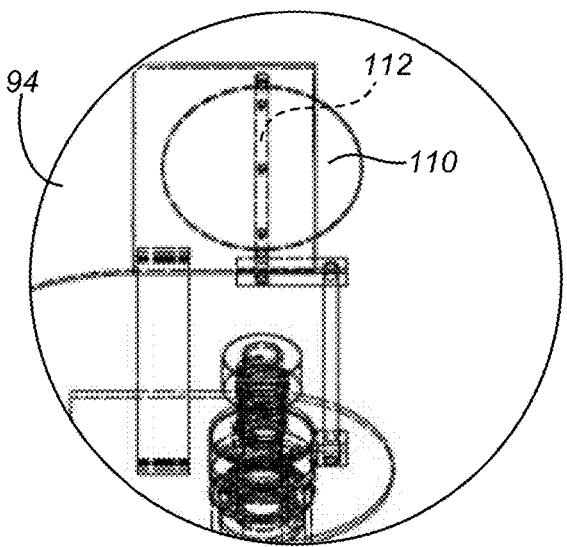
FIG. 13A is a detailed view of the section defined by line 13A of FIG. 13.
Figure 14:
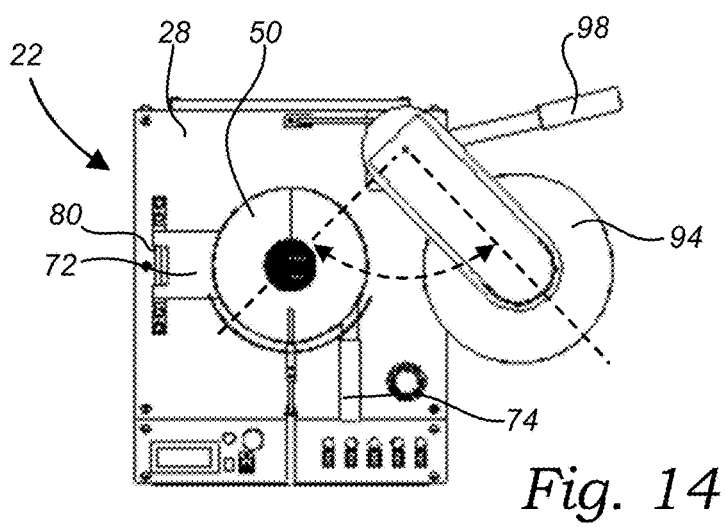
FIG. 14 is top plan view of the exemplary roaster and exemplary chaff hood, in accordance with at least one embodiment.
Figure 15A:
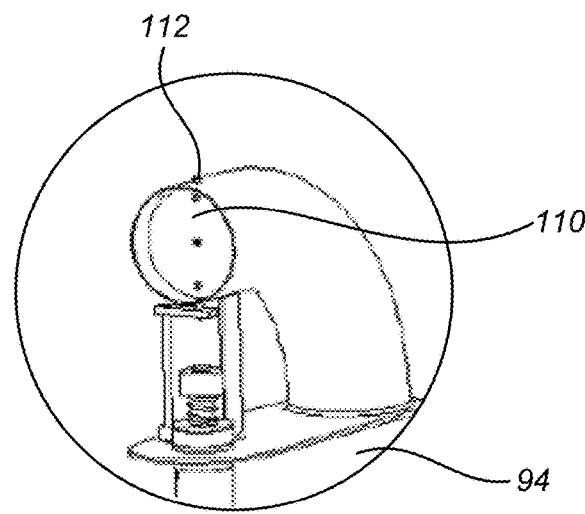
FIG. 15A is a detailed view of the section defined by line 15A of FIG. 15.
Figure 15:
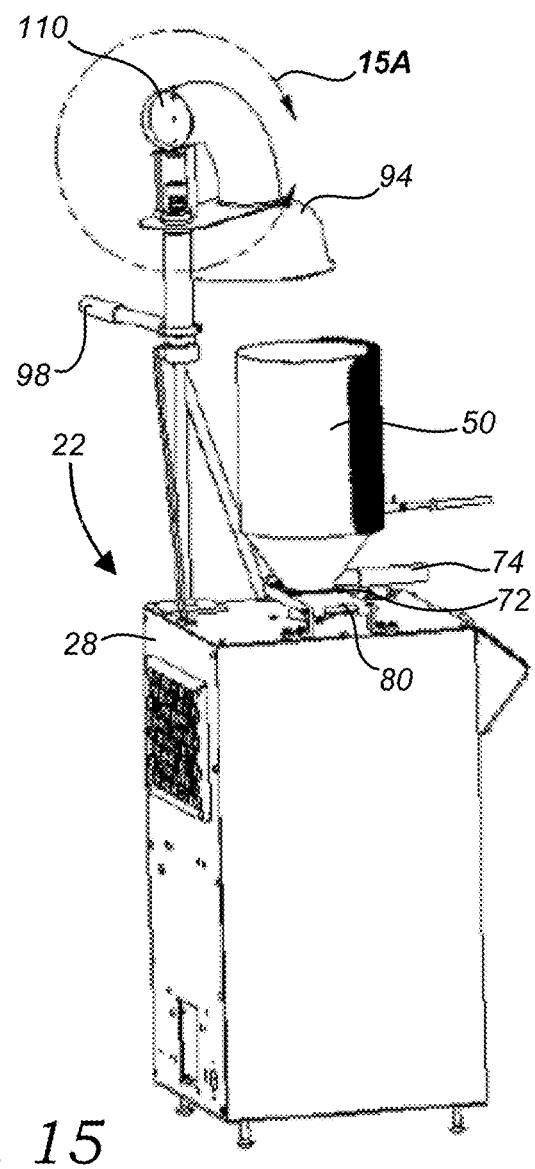
FIG. 15 is a perspective view of the exemplary roaster, with the exemplary chaff hood and accompanying gate valve in a closed position, in accordance with at least one embodiment.

In at least one embodiment, while the roasting unit 22 actively roasts a batch of coffee beans, the chaff collection unit 24 is positioned and configured for drawing off and capturing any loose chaff released by the coffee beans within the roasting chamber 50 (FIGS. 1 and 2). In at least one such embodiment, the chaff collection unit 24 provides a collection housing 88 that supports an at least one collection blower 90 which provides suction to draw loose chaff into a cyclone that separates and collects the chaff from the high-velocity, heated air emitted by the air nozzle 48, then subsequently deposits the collected chaff into a collection container 92. The chaff collection unit 24 also provides a suction hood 94 in fluid communication with the collection blower 90 via a collection tube 96. In at least one such embodiment, as illustrated in FIGS. 13, 14 and 15, the suction hood 94 is configured for pivoting relative to the roasting unit 22 and selectively moving between one of an active position—wherein the suction hood 94 is pivoted toward the roasting unit 22 so as to be positioned directly overtop of the roasting chamber 50 (FIG. 13)—and an inactive position—wherein the suction hood 94 is pivoted away from the roasting unit 22 so as to no longer be positioned directly overtop of the roasting chamber 50 (FIGS. 14 and 15), thereby allowing the roasting chamber 50 to be moved into its inactive position in order to dump the roasted coffee beans into the cooling unit 26. In at least one such embodiment, the suction hood 94 is pivotally mounted to the roast housing 28. In at least one alternate embodiment, the suction hood 94 is pivotally mounted to the collection housing 88. In at least one embodiment, the suction hood 94 provides a hood handle 98 for manually moving the suction hood 94 between the active and inactive positions.

In at least one embodiment, as illustrated in FIG. 1, the cooling unit 26 provides a cooler housing 100. The cooler housing 100 provides an at least one cooling blower 102, along with a cooling tray 104 positioned and configured for allowing the cooling blower 102 to draw relatively cooler, ambient air down through the cooling tray 104. In at least one embodiment, the cooling tray 104 is constructed out of a screen, wire or mesh material. However, in further embodiments, the cooling tray 104 may be constructed out of any material (or combinations of materials)—now known or later developed—capable of allowing air to be drawn down through the cooling tray 104. The cooling tray 104 is further positioned and configured for receiving the roasted coffee beans from the roasting chamber 50 when the tilt arm 72 is moved into the inactive position. Once the roasted coffee beans have been dumped into the cooling tray 104, the cooling blower 102 is used to draw relatively cooler, ambient air through the cooling tray 104 and, in turn, through the coffee beans, thereby stopping the coffee beans from roasting. Rapid cooling of the hot coffee beans is essential to arrest the roast progress and lock in the flavor of the coffee beans that was developed at the final roasting temperature. Without sufficient cooling, the coffee beans will continue to self-roast, thus changing the degree of roasting desired. In at least one embodiment, the cooler housing 100 further provides an exhaust vent 106 in fluid communication with the at least one cooling blower 102, the exhaust vent 106 positioned and configured for expelling the ambient air, along with any accompanying smoke from the roasted coffee beans, that has been drawn in by the cooling blower 102.

In at least one further embodiment, to further accelerate the cooling of the roasted coffee beans (thereby arresting the coffee bean roast quickly in order to lock in the desired degree of roast), the at least one collection blower 90 of the chaff collection unit 24 is also in fluid communication with cooler housing 100 via a cooling tube 108 (FIG. 1) and configured for selectively drawing relatively cooler, ambient air down through the cooling tray 104 in conjunction with the at least one cooling blower 102.

In at least one such embodiment, the at least one collection blower 90 is configured for being selectively switched between a collection mode—wherein the at least one collection blower 90 provides suction to the suction hood 94 in order to draw loose chaff from the high-velocity, heated air emitted by the air nozzle 48 of the roasting unit 22, then subsequently deposits the collected chaff into the collection container 92—and a cooling mode—wherein the at least one collection blower 90 provides suction to the cooler housing 100 in order to draw relatively cooler, ambient air down through the cooling tray 104. In at least one such embodiment, the suction hood 94 provides a stationary gate valve 110 positioned and configured for switching the at least one collection blower 90 between the collection mode and cooling mode. In at least one such embodiment, the gate valve 110 comprises a circular disc that mounts to a shaft 112 which is central to a centerline of rotation of the suction hood 94. In a bit more detail, as illustrated in FIGS. 13-15, when the suction hood 94 is pivoted into the inactive position, the motion of pivoting the suction hood approximately 90 degrees away from the roasting unit 22 (so as to no longer be positioned directly overtop of the roasting chamber 50) orients the stationary gate valve 110 perpendicular to the air flow within the collection tube 96 (FIG. 15A), thereby blocking suction to the suction hood 94. When suction to the suction hood 94 is blocked by the gate valve 110, the suction force generated by the at least one collection blower 90 is directed to the cooler housing 100 (i.e., the at least one collection blower 90 is switched to cooling mode). When the system 20 is used to roast a further batch of green coffee beans, the suction hood 94 may be pivoted back into the active position, which orients the stationary gate valve 110 parallel to the air flow within the collection tube 96, thereby providing suction to the suction hood 94 via the at least one collection blower 90 (i.e., the at least one collection blower 90 is switched back to collection mode). In still further embodiments, any other mechanisms (or combinations of mechanisms)—now known or later developed— capable of selectively switching the at least one collection blower 90 between the collection mode and cooling mode may be substituted.

Through these various inventive features, the system 20 is capable of roasting batches of coffee beans of varying sizes—ranging from relatively small profile sizes to relatively large production sizes—without increasing the size of the system 20, operating costs of the system 20, or desired roasting times. Evidence of this can be found in the table of FIG. 16, which provides exemplary test data in connection with roasting green coffee beans using the system 20, in accordance with at least one embodiment.

Aspects of the present specification may also be described as the following embodiments:

1. A roasting unit for a fluid bed coffee roasting system comprising: a roast housing providing an at least one partition positioned within the roast housing which defines a plurality of heating chambers in serial fluid communication with one another, thereby forming an air path having an initial end and a terminal end; an upper end of the roast housing providing an upwardly-directed air nozzle in fluid communication with the terminal end of the air path; an open-ended roasting chamber configured for retaining a volume of coffee beans therewithin during use of the roasting unit, a base plate of the roasting chamber providing an inlet orifice that is removably engagable with the air nozzle; an at least one roasting blower in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber; and the roast housing further providing a heating panel containing a plurality of heating elements positioned thereon, the heating elements arranged on the heating panel so as to be positioned within one or more of the heating chambers; whereby, as air moves through the air path during use of the roasting unit, the air is forced to pass over each of the heating elements in series, thereby progressively increasing the temperature of the air until the air reaches the terminal end of the air path.

2. The roasting unit according to embodiment 1, wherein the roast housing has a height of approximately thirty-two inches, a width of approximately eighteen inches, and a depth of approximately eighteen inches.

3. The roasting unit according to embodiments 1-2, wherein the heating chambers are positioned adjacent to one another, thereby forming a winding air path within the roast housing.

4. The roasting unit according to embodiments 1-3, wherein the at least one partition defines: a substantially vertically-oriented first heating chamber and a laterally spaced-apart, substantially vertically-oriented third heating chamber, with a substantially horizontally-oriented second heating chamber positioned proximal an upper end of the roast housing and interconnecting the first and third heating chambers; and a substantially vertically-oriented fourth heating chamber positioned between the first and third heating chambers, with the at least one partition defining a hole which interconnects the third heating chamber with the fourth heating chamber.

5. The roasting unit according to embodiments 1-4, wherein the air nozzle extends through the second heating chamber and connects to an upper end of the fourth heating chamber.

6. The roasting unit according to embodiments 1-5, wherein the air path formed by the heating chambers is approximately four times greater than a height of the roast housing.

7. The roasting unit according to embodiments 1-6, wherein a first heating element is positioned within the first heating chamber, a second heating element is positioned within the third heating chamber, and a third heating element is positioned within the fourth heating chamber.

8. The roasting unit according to embodiments 1-7, wherein the heating panel is removably engaged with the roast housing.

9. The roasting unit according to embodiments 1-8, wherein each of the heating elements is oriented within a corresponding one of the heating chambers so as to be substantially parallel with the air path within said heating chamber.

10. The roasting unit according to embodiments 1-9, wherein each of the heating elements is configured for being selectively heated during use of the roasting unit.

11. The roasting unit according to embodiments 1-10, wherein each of the heating elements is an electric heating element.

12. The roasting unit according to embodiments 1-11, wherein the roasting unit is configured for being powered by both 1-phase, 240V power and 3-phase, 208V power.

13. The roasting unit according to embodiments 1-12, further comprising a perforated screen spanning the air nozzle for assisting with forming the high-velocity, heated air into a substantially vertically-oriented column as the air exits the air nozzle and enters the roasting chamber.

14. The roasting unit according to embodiments 1-13, wherein the perforated screen is comprised of a hole pattern of sufficient size to prevent debris or foreign matter from entering the heating chambers when the roasting unit is not in use.

15. The roasting unit according to embodiments 1-14, further comprising a substantially vertically-oriented air director positioned within the air nozzle, above the perforated screen, for further assisting with forming the high-velocity, heated air into a substantially vertically-oriented column as the air exits the air nozzle and enters the roasting chamber.

16. The roasting unit according to embodiments 1-15, further comprising an at least one thermometer positioned and configured for measuring the temperature of the air as it exits the terminal end of the air path.

17. The roasting unit according to embodiments 1-16, wherein the at least one thermometer is a thermocouple probe engaged with the air nozzle in a position substantially perpendicular to the air director.

18. The roasting unit according to embodiments 1-17, wherein a speed of the at least one roasting blower is selectively adjustable.

19. The roasting unit according to embodiments 1-18, wherein the at least one roasting blower is positioned proximal a lower end of the roast housing.

20. The roasting unit according to embodiments 1-19, wherein the lower end of the roast housing provides a pressure chamber in fluid communication with the initial end of the air path, and the at least one roasting blower is positioned substantially within the pressure chamber.

21. The roasting unit according to embodiments 1-20, wherein the inlet orifice of the roasting chamber has a diameter that approximates a diameter of the air nozzle.

22. The roasting unit according to embodiments 1-21, further comprising: a tilt arm pivotally engaged with the roast housing and providing an aperture extending therethrough, the inlet orifice of the roasting chamber configured for engagement with the aperture; whereby, the tilt arm is capable of selectively moving between one of an active position—wherein the tilt arm is pivoted toward the roasting unit so as to create a removable engagement between the air nozzle and the inlet orifice of the roasting chamber via the aperture—and an inactive position—wherein the tilt arm is pivoted away from the roasting unit, thereby disengaging the inlet orifice of the roasting chamber from the air nozzle, and subsequently tipping the roasting chamber so that the roasted coffee beans are dumped out of the roasting chamber.

23. The roasting unit according to embodiments 1-22, wherein the tilt arm provides an arm handle for manually moving the tilt arm between the active and inactive positions.

24. The roasting unit according to embodiments 1-23, wherein the base plate of the roasting chamber is configured for engagement with a top surface of the tilt arm.

25. The roasting unit according to embodiments 1-24, wherein the tilt arm provides a mating portion positioned within the aperture and extending from an opposing bottom surface of the tilt arm, creating an airtight engagement with the air nozzle when the tilt arm is in the active position.

26. The roasting unit according to embodiments 1-25, wherein an outer surface of the air nozzle is tapered for being removably inserted into the mating portion when the tilt arm is in the active position, with an inner surface of the mating portion having a corresponding chamfered diameter.

27. A roasting unit for a fluid bed coffee roasting system comprising: a roast housing providing an at least one heating chamber forming an air path having an initial end and a terminal end; an upper end of the roast housing providing an upwardly-directed air nozzle in fluid communication with the terminal end of the air path; a tilt arm pivotally engaged with the roast housing and providing an aperture extending therethrough from a top surface to an opposing bottom surface of the tilt arm; the tilt arm further providing a mating portion positioned within the aperture and extending from the bottom surface of the tilt arm for selectively creating an airtight engagement with the air nozzle; an at least one open-ended roasting chamber configured for retaining a volume of coffee beans therewithin during use of the roasting unit; each of the at least one roasting chamber providing a base plate of substantially uniform dimensions configured for engagement with a top surface of the tilt arm, the base plate providing an inlet orifice in fluid communication with the aperture of the tilt arm; an at least one roasting blower in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber; and the roast housing further providing a heating panel containing an at least one heating element positioned thereon, the at least one heating element arranged on the heating panel so as to be positioned within the at least one heating chamber for heating the air as the air moves through the air path during use of the roasting unit; whereby, the tilt arm is capable of selectively moving between one of an active position—wherein the tilt arm is pivoted toward the roasting unit so as to a fluid communication between the air nozzle and the inlet orifice of the roasting chamber via the aperture—and an inactive position—wherein the tilt arm is pivoted away from the roasting unit, thereby disrupting the fluid communication between the air nozzle and the inlet orifice of the roasting chamber, and subsequently tipping the roasting chamber so that the roasted coffee beans are dumped out of the roasting chamber.

28. The roasting unit according to embodiment 27, wherein the inlet orifice of the roasting chamber has a diameter that approximates a diameter of the air nozzle.

29. The roasting unit according to embodiments 27-28, wherein the tilt arm provides an arm handle for manually moving the tilt arm between the active and inactive positions.

30. The roasting unit according to embodiments 27-29, wherein an outer surface of the air nozzle is tapered for being removably inserted into the mating portion when the tilt arm is in the active position, with an inner surface of the mating portion having a corresponding chamfered diameter.

31. A fluid bed coffee roasting system comprising: a roasting unit configured for roasting a volume of coffee beans, the roasting unit comprising: a roast housing that supports an at least one open-ended roasting chamber configured for retaining a volume of coffee beans therewithin during use of the roasting unit; and an at least one roasting blower in fluid communication the roasting chamber and configured for moving a volume of air into the roasting chamber at a velocity sufficient for levitating the coffee beans in a bed of air within the roasting chamber; a cooling unit positioned and configured for receiving and cooling the coffee beans after the coffee beans are removed from the roasting chamber, the cooling unit comprising: a cooler housing that supports an at least one cooling blower, along with a cooling tray positioned and configured for receiving the coffee beans from the roasting chamber and allowing the cooling blower to draw ambient air down through the cooling tray, thereby cooling the coffee beans; and a chaff collection unit positioned and configured for drawing off and capturing any loose chaff released by the coffee beans within the roasting chamber, the chaff collection unit comprising: a collection housing that supports an at least one collection blower in selective fluid communication with each of a suction hood, via a collection tube, and the cooler housing, via a cooling tube; and the suction hood configured for pivoting relative to the roasting unit and selectively moving between one of an active position—wherein the suction hood is pivoted toward the roasting unit so as to be positioned directly overtop of the roasting chamber—and an inactive position—wherein the suction hood is pivoted away from the roasting unit so as to no longer be positioned directly overtop of the roasting chamber; whereby, the at least one collection blower is configured for being selectively switched between a collection mode—wherein the at least one collection blower provides suction to the suction hood in order to draw loose chaff from roasting chamber when the suction hood is in the active position—and a cooling mode—wherein the at least one collection blower provides suction to the cooler housing in order to draw additional ambient air down through the cooling tray when the suction hood is in the inactive position.

32. The fluid bed coffee roasting system according to embodiment 31, wherein: the suction hood provides a stationary gate valve positioned and configured for switching the at least one collection blower between the collection mode and cooling mode; whereby, when the suction hood is pivoted into the inactive position, the stationary gate valve is oriented perpendicular to the air flow within the collection tube, thereby blocking suction to the suction hood and redirecting suction from the at least one collection blower to the cooler housing; and whereby, when the suction hood is pivoted into the active position, the stationary gate valve is oriented parallel to the air flow within the collection tube, thereby providing suction to the suction hood via the at least one collection blower.

33. The fluid bed coffee roasting system according to embodiments 31-32, wherein the gate valve comprises a circular disc that mounts to a shaft which is central to a centerline of rotation of the suction hood.

34. The fluid bed coffee roasting system according to embodiments 31-33, wherein the chaff collection unit further comprises an at least one collection container configured for receiving the loose chaff collected by the at least one collection blower.

35. The fluid bed coffee roasting system according to embodiments 31-34, wherein the suction hood is pivotally mounted to the roast housing.

36. The fluid bed coffee roasting system according to embodiments 31-35, wherein the suction hood is pivotally mounted to the collection housing.

37. The fluid bed coffee roasting system according to embodiments 31-36, wherein the suction hood provides a hood handle for manually moving the suction hood between the active and inactive positions.

38. The fluid bed coffee roasting system according to embodiments 31-37, wherein the cooling tray is constructed out of a screen, wire or mesh material.

39. The fluid bed coffee roasting system according to embodiments 31-38, wherein the cooler housing further provides an exhaust vent in fluid communication with the at least one cooling blower, the exhaust vent positioned and configured for expelling the ambient air, along with any accompanying smoke from the roasted coffee beans, that has been drawn in by the cooling blower.

40. The fluid bed coffee roasting system according to embodiments 31-39, wherein the roasting unit further comprises: an at least one partition positioned within the roast housing which defines a plurality of heating chambers in serial fluid communication with one another, thereby forming an air path having an initial end and a terminal end; an upper end of the roast housing providing an upwardly-directed air nozzle in fluid communication with the terminal end of the air path; a base plate of the roasting chamber providing an inlet orifice that is removably engagable with the air nozzle; the at least one roasting blower in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber; and the roast housing further providing a heating panel containing a plurality of heating elements positioned thereon, the heating elements arranged on the heating panel so as to be positioned within one or more of the heating chambers; whereby, as air moves through the air path during use of the roasting unit, the air is forced to pass over each of the heating elements in series, thereby progressively increasing the temperature of the air until the air reaches the terminal end of the air path.

41. The fluid bed coffee roasting system according to embodiments 31-40, wherein the roast housing has a height of approximately thirty-two inches, a width of approximately eighteen inches, and a depth of approximately eighteen inches.

42. The fluid bed coffee roasting system according to embodiments 31-41, wherein the heating chambers are positioned adjacent to one another, thereby forming a winding air path within the roast housing.

43. The fluid bed coffee roasting system according to embodiments 31-42, wherein the at least one partition defines: a substantially vertically-oriented first heating chamber and a laterally spaced-apart, substantially vertically-oriented third heating chamber, with a substantially horizontally-oriented second heating chamber positioned proximal an upper end of the roast housing and interconnecting the first and third heating chambers; and a substantially vertically-oriented fourth heating chamber positioned between the first and third heating chambers, with the at least one partition defining a hole which interconnects the third heating chamber with the fourth heating chamber.

44. The fluid bed coffee roasting system according to embodiments 31-43, wherein the air nozzle extends through the second heating chamber and connects to an upper end of the fourth heating chamber.

45. The fluid bed coffee roasting system according to embodiments 31-44, wherein the air path formed by the heating chambers is approximately four times greater than a height of the roast housing.

46. The fluid bed coffee roasting system according to embodiments 31-45, wherein a first heating element is positioned within the first heating chamber, a second heating element is positioned within the third heating chamber, and a third heating element is positioned within the fourth heating chamber.

47. The fluid bed coffee roasting system according to embodiments 31-46, wherein the heating panel is removably engaged with the roast housing.

48. The fluid bed coffee roasting system according to embodiments 31-47, wherein each of the heating elements is oriented within a corresponding one of the heating chambers so as to be substantially parallel with the air path within said heating chamber.

49. The fluid bed coffee roasting system according to embodiments 31-48, wherein each of the heating elements is configured for being selectively heated during use of the roasting unit.

50. The fluid bed coffee roasting system according to embodiments 31-49, wherein each of the heating elements is an electric heating element.

51. The fluid bed coffee roasting system according to embodiments 31-50, wherein the roasting unit is configured for being powered by both 1-phase, 240V power and 3-phase, 208V power.

52. The fluid bed coffee roasting system according to embodiments 31-51, further comprising a perforated screen spanning the air nozzle for assisting with forming the high-velocity, heated air into a substantially vertically-oriented column as the air exits the air nozzle and enters the roasting chamber.

53. The fluid bed coffee roasting system according to embodiments 31-52, wherein the perforated screen is comprised of a hole pattern of sufficient size to prevent debris or foreign matter from entering the heating chambers when the roasting unit is not in use.

54. The fluid bed coffee roasting system according to embodiments 31-53, further comprising a substantially vertically-oriented air director positioned within the air nozzle, above the perforated screen, for further assisting with forming the high-velocity, heated air into a substantially vertically-oriented column as the air exits the air nozzle and enters the roasting chamber.

55. The fluid bed coffee roasting system according to embodiments 31-54, further comprising an at least one thermometer positioned and configured for measuring the temperature of the air as it exits the terminal end of the air path.

56. The fluid bed coffee roasting system according to embodiments 31-55, wherein the at least one thermometer is a thermocouple probe engaged with the air nozzle in a position substantially perpendicular to the air director.

57. The fluid bed coffee roasting system according to embodiments 31-56, wherein a speed of the at least one roasting blower is selectively adjustable.

58. The fluid bed coffee roasting system according to embodiments 31-57, wherein the at least one roasting blower is positioned proximal a lower end of the roast housing.

59. The fluid bed coffee roasting system according to embodiments 31-58, wherein the lower end of the roast housing provides a pressure chamber in fluid communication with the initial end of the air path, and the at least one roasting blower is positioned substantially within the pressure chamber.

60. The fluid bed coffee roasting system according to embodiments 31-59, wherein the inlet orifice of the roasting chamber has a diameter that approximates a diameter of the air nozzle.

61. The fluid bed coffee roasting system according to embodiments 31-60, further comprising: a tilt arm pivotally engaged with the roast housing and providing an aperture extending therethrough, the inlet orifice of the roasting chamber configured for engagement with the aperture; whereby, the tilt arm is capable of selectively moving between one of an active position—wherein the tilt arm is pivoted toward the roasting unit so as to create a removable engagement between the air nozzle and the inlet orifice of the roasting chamber via the aperture—and an inactive position—wherein the tilt arm is pivoted away from the roasting unit, thereby disengaging the inlet orifice of the roasting chamber from the air nozzle, and subsequently tipping the roasting chamber so that the roasted coffee beans are dumped out of the roasting chamber.

62. The fluid bed coffee roasting system according to embodiments 31-61, wherein the tilt arm provides an arm handle for manually moving the tilt arm between the active and inactive positions.

63. The fluid bed coffee roasting system according to embodiments 31-62, wherein the base plate of the roasting chamber is configured for engagement with a top surface of the tilt arm.

64. The fluid bed coffee roasting system according to embodiments 31-63, wherein the tilt arm provides a mating portion positioned within the aperture and extending from an opposing bottom surface of the tilt arm, creating an airtight engagement with the air nozzle when the tilt arm is in the active position.

65. The fluid bed coffee roasting system according to embodiments 31-64, wherein an outer surface of the air nozzle is tapered for being removably inserted into the mating portion when the tilt arm is in the active position, with an inner surface of the mating portion having a corresponding chamfered diameter.

66. The fluid bed coffee roasting system according to embodiments 31-65, wherein the cooling tray is positioned and configured for receiving the roasted coffee beans from the roasting chamber when the tilt arm is moved into the inactive position.

In closing, regarding the exemplary embodiments of the present invention as shown and described herein, it will be appreciated that a fluid bed coffee roasting system is disclosed and configured for roasting batches of coffee beans of varying sizes—ranging from relatively small profile sizes to relatively large production sizes—without increasing the size of the system, operating costs of the system, or desired roasting times. Because the principles of the invention may be practiced in a number of configurations beyond those shown and described, it is to be understood that the invention is not in any way limited by the exemplary embodiments, but is generally directed to a fluid bed coffee roasting system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A roasting unit for a fluid bed coffee roasting system comprising:
    a roast housing providing an at least one partition positioned within the roast housing which defines a plurality of heating chambers in serial fluid communication with one another, thereby forming an air path having an initial end and a terminal end, said heating chambers comprising:
        a vertically-oriented first heating chamber;
        a vertically-oriented third heating chamber laterally spaced-apart from the first heating chamber;
        a horizontally-oriented second heating chamber positioned proximal an upper end of the roast housing and interconnecting the first and third heating chambers; and
        a vertically-oriented fourth heating chamber positioned between the first and third heating chambers, with the at least one partition defining a hole which interconnects the third heating chamber with the fourth heating chamber;
    the upper end of the roast housing providing an upwardly-directed air nozzle in fluid communication with the terminal end of the air path, the air nozzle extending through the second heating chamber and connecting to an upper end of the fourth heating chamber;
    an open-ended roasting chamber configured for retaining a volume of coffee beans therewithin during use of the roasting unit, a base plate of the roasting chamber providing an inlet orifice that is removably engagable with the air nozzle;
    an at least one roasting blower in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber; and
    a plurality of heating elements positioned within one or more of the heating chambers and configured for being selectively heated during use of the roasting unit, thereby allowing the temperature of the air moving through the air path to be adjusted by selectively heating more or fewer of the heating elements;
    whereby, as air moves through the air path during use of the roasting unit, the air is forced to pass over each of the heating elements in series, thereby progressively increasing the temperature of the air until the air reaches the terminal end of the air path.

2. The roasting unit of claim 1, wherein the heating chambers are positioned adjacent to one another, thereby forming a winding air path within the roast housing.

3. The roasting unit of claim 1, wherein a first heating element is positioned within the first heating chamber, a second heating element is positioned within the third heating chamber, and a third heating element is positioned within the fourth heating chamber.

4. The roasting unit of claim 1, wherein each of the heating elements is an electric heating element.

5. The roasting unit of claim 4, wherein the roasting unit is configured for being powered by both 1-phase, 240V power and 3-phase, 208V power.

6. The roasting unit of claim 1, further comprising a perforated screen spanning the air nozzle for assisting with forming the high-velocity, heated air into a vertically-oriented column as the air exits the air nozzle and enters the roasting chamber.

7. The roasting unit of claim 6, further comprising a vertically-oriented air director positioned within the air nozzle, above the perforated screen, for further assisting with forming the high-velocity, heated air into a vertically-oriented column as the air exits the air nozzle and enters the roasting chamber.

8. The roasting unit of claim 1, wherein a lower end of the roast housing provides a pressure chamber in fluid communication with the initial end of the air path, and the at least one roasting blower is positioned within the pressure chamber.

9. The roasting unit of claim 1, wherein the roast housing provides a heating panel on which each of the heating elements is positioned, the heating elements arranged on the heating panel so as to be positioned within one or more of the heating chambers.

10. The roasting unit of claim 1, wherein the air path formed by the heating chambers has a length that is four times greater than a height of the roast housing.

11. The roasting unit of claim 1, further comprising:
    a tilt arm pivotally engaged with the roast housing and providing an aperture extending therethrough, the inlet orifice of the roasting chamber configured for engagement with the aperture;
    whereby, the tilt arm is capable of selectively moving between one of an active position—wherein the tilt arm is pivoted toward the roasting unit so as to create a removable engagement between the air nozzle and the inlet orifice of the roasting chamber via the aperture—and an inactive position—wherein the tilt arm is pivoted away from the roasting unit, thereby disengaging the inlet orifice of the roasting chamber from the air nozzle, and subsequently tipping the roasting chamber so that the roasted coffee beans are dumped out of the roasting chamber.

12. The roasting unit of claim 11, wherein the base plate of the roasting chamber is configured for engagement with a top surface of the tilt arm.

13. The roasting unit of claim 12, wherein the tilt arm provides a mating portion positioned within the aperture and extending from an opposing bottom surface of the tilt arm, creating an airtight engagement with the air nozzle when the tilt arm is in the active position.

14. The roasting unit of claim 13, wherein an outer surface of the air nozzle is tapered for being removably inserted into the mating portion when the tilt arm is in the active position, with an inner surface of the mating portion having a corresponding chamfered diameter.

15. A roasting unit for a fluid bed coffee roasting system comprising:
    a roast housing providing an at least one partition positioned within the roast housing which defines a plurality of heating chambers in serial fluid communication with one another, thereby forming an air path having an initial end and a terminal end;

an upper end of the roast housing providing an upwardly-directed air nozzle in fluid communication with the terminal end of the air path;

an upper end of the roast housing providing an upwardly-directed air nozzle in fluid communication with the terminal end of the air path;

an open-ended roasting chamber configured for retaining a volume of coffee beans therewithin during use of the roasting unit, a base plate of the roasting chamber providing an inlet orifice that is removably engagable with the air nozzle;

an at least one roasting blower in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber; and a plurality of heating elements positioned within at least two of the heating chambers and configured for being selectively heated during use of the roasting unit, thereby allowing the temperature of the air moving through the air path to be adjusted by selectively heating more or fewer of the heating elements;

whereby, as air moves through the air path during use of the roasting unit, the air is forced to pass over each of the heating elements in series, thereby progressively increasing the temperature of the air until the air reaches the terminal end of the air path.

16. A roasting unit for a fluid bed coffee roasting system comprising:

a roast housing providing an at least one partition positioned within the roast housing which defines a plurality of heating chambers in serial fluid communication with one another, thereby forming an air path having an initial end and a terminal end;

an upper end of the roast housing providing an upwardly-directed air nozzle in fluid communication with the terminal end of the air path;

a tilt arm pivotally engaged with the roast housing and providing an aperture extending therethrough;

an open-ended roasting chamber configured for retaining a volume of coffee beans therewithin during use of the roasting unit, a base plate of the roasting chamber providing an inlet orifice that is selectively engagable with the aperture of the tilt arm;

whereby, the tilt arm is capable of selectively moving between one of an active position—wherein the tilt arm is pivoted toward the roasting unit so as to create a removable engagement between the air nozzle and the inlet orifice of the roasting chamber via the aperture—and an inactive position—wherein the tilt arm is pivoted away from the roasting unit, thereby disengaging the inlet orifice of the roasting chamber from the air nozzle, and subsequently tipping the roasting chamber so that the roasted coffee beans are dumped out of the roasting chamber;

an at least one roasting blower in fluid communication with the initial end of the air path and configured for moving a volume of air from the initial end of the air path, through the terminal end of the air path, out the air nozzle and into the inlet orifice of the roasting chamber at a velocity sufficient for levitating the coffee beans in a bed of air within the roasting chamber; and a plurality of heating elements positioned within one or more of the heating chambers;

whereby, as air moves through the air path during use of the roasting unit, the air is forced to pass over each of the heating elements in series, thereby progressively increasing the temperature of the air until the air reaches the terminal end of the air path.

17. The roasting unit of claim 16, wherein the base plate of the roasting chamber is configured for engagement with a top surface of the tilt arm.

18. The roasting unit of claim 16, wherein the tilt arm provides a mating portion positioned within the aperture and extending from an opposing bottom surface of the tilt arm, creating an airtight engagement with the air nozzle when the tilt arm is in the active position.

19. The roasting unit of claim 18, wherein the inlet orifice of the roasting chamber has a diameter that approximates a diameter of the air nozzle.

20. The roasting unit of claim 18, wherein an outer surface of the air nozzle is tapered for being removably inserted into the mating portion when the tilt arm is in the active position, with an inner surface of the mating portion having a corresponding chamfered diameter.

\* \* \* \* \*